United States Patent
Schmelzer et al.

(10) Patent No.: US 10,454,851 B2
(45) Date of Patent: Oct. 22, 2019

(54) OPTIMIZED LINK FAILURE CONVERGENCE FOR RESILIENT ETHERNET PROTOCOL NETWORKS

(71) Applicant: Cisco Technology, Inc., San Jose, CA (US)

(72) Inventors: Adam Henry Schmelzer, Cary, NC (US); Lin Zhang, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 14/688,857

(22) Filed: Apr. 16, 2015

(65) Prior Publication Data

US 2016/0308789 A1    Oct. 20, 2016

(51) Int. Cl.
| | |
|---|---|
| *H04L 12/939* | (2013.01) |
| *H04L 12/26* | (2006.01) |
| *H04L 12/721* | (2013.01) |
| *H04L 12/707* | (2013.01) |
| *H04L 12/703* | (2013.01) |
| *H04L 12/741* | (2013.01) |

(52) U.S. Cl.
CPC ........ *H04L 49/557* (2013.01); *H04L 43/0811* (2013.01); *H04L 45/22* (2013.01); *H04L 45/28* (2013.01); *H04L 45/54* (2013.01); *H04L 45/66* (2013.01)

(58) Field of Classification Search
CPC ... H04L 12/26; H04L 12/462; H04L 41/0654; H04L 41/0853; H04L 45/02; H04L 45/28
See application file for complete search history.

(56) References Cited

U.S. PATENT DOCUMENTS

| | | | |
|---|---|---|---|
| 6,507,562 B1* | 1/2003 | Kadansky | H04L 12/1877 370/216 |
| 7,613,201 B1 | 11/2009 | Yang et al. | |
| 8,279,750 B2 | 10/2012 | Menth et al. | |
| 8,355,348 B1* | 1/2013 | Miller | H04L 12/42 370/256 |
| 2002/0112072 A1* | 8/2002 | Jain | H04L 45/00 709/239 |
| 2004/0190455 A1 | 9/2004 | Hashimoto | |
| 2005/0180749 A1 | 8/2005 | Koley et al. | |
| 2007/0171814 A1* | 7/2007 | Florit | H04L 12/437 370/216 |
| 2008/0205302 A1* | 8/2008 | Florit | H04L 12/462 370/255 |

(Continued)

FOREIGN PATENT DOCUMENTS

CN   103546271 A   1/2014

Primary Examiner — Kevin C. Harper
(74) Attorney, Agent, or Firm — Patterson + Sheridan, LLP

(57) ABSTRACT

Embodiments provide techniques for optimizing link failure convergence for Resilient Ethernet Protocol (REP) networks. Embodiments include monitoring for link failure events within the REP environment. Additionally, upon determining, at a first network switch within the REP environment, that a link failure event has occurred within the REP environment, embodiments include transmitting a Hardware Flood Layer (HFL) notification data packet specifying a Time-to-Live (TTL) value of 2 to a second network switch within the REP environment and purging contents of a Media Access Control (MAC) table on the first network switch.

14 Claims, 7 Drawing Sheets

(56) References Cited

U.S. PATENT DOCUMENTS

| | | | |
|---|---|---|---|
| 2009/0034538 A1* | 2/2009 | Sato | H04L 12/437 370/400 |
| 2009/0175166 A1* | 7/2009 | Long | H04L 12/437 370/225 |
| 2010/0039961 A1* | 2/2010 | Tallet | H04L 12/462 370/256 |
| 2011/0128970 A1* | 6/2011 | Breton | H04L 12/2852 370/463 |
| 2013/0279320 A1* | 10/2013 | Cheng | H04L 45/22 370/218 |
| 2014/0089506 A1* | 3/2014 | Puttaswamy Naga | H04L 45/42 709/225 |

\* cited by examiner

OPTIMIZED LINK FAILURE CONVERGENCE FOR RESILIENT ETHERNET PROTOCOL NETWORKS

TECHNICAL FIELD

Embodiments presented in this disclosure generally relate to computer networks, and more specifically, embodiments disclosed herein relate to optimizing convergence after a failure in a layer 2 switched network.

BACKGROUND

Data communication in a computer network involves the exchange of data between two or more entities interconnected by communication links and subnetworks. A local area network (LAN) is an example of a subnetwork that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and subnetworks, whereas an end station may be a computer located on one of the subnetworks. More generally, an end station connotes a source of or target for data that typically does not provide routing or other services to other computers on the network.

A packet-switched network refers to a type of network in which relatively small units of data (i.e., packets) are routed through the network based on destination address information contained within each packet. Breaking communication down into packets allows the same data path to be shared among many users in the network. This type of communication between sender and receiver is known as connectionless (rather than dedicated). Most traffic over the Internet uses packet switching and the Internet is generally a connectionless network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. Generally, each layer is responsible for providing some service to the layer above it, and similarly each layer may use services of the layer below it. The International Standards Organization ("ISO") defined seven layers as a standard for computer networks in creating the OSI model. The layers are defined as follows: (1) the physical layer, (2) the data link layer, (3) the network layer, (4) the transport layer, (5) the session layer, (6) the presentation layer, and (7) the application layer. Generally, the physical layer is responsible for transmitting unstructured bits of information across a link. The data link layer generally provides error-free transfer of data frames over the physical layer, allowing layers above it to assume virtually error-free transmission over the link. The network layer is responsible for ensuring that any pair of systems in the network can communicate with each other, while the transport layer establishes a reliable communications stream between a pair of systems. The session layer generally facilitates the establishment of sessions between processes running on different sessions, by providing functionality for session establishment, maintenance and termination, as well as session support functionality such as security, name recognition services, and so on. Additionally, the presentation layer is responsible for the delivery and formatting of application layer information, while the application layer is responsive with the transfer and manipulating application data (e.g., transferring files, mail services, and so on).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
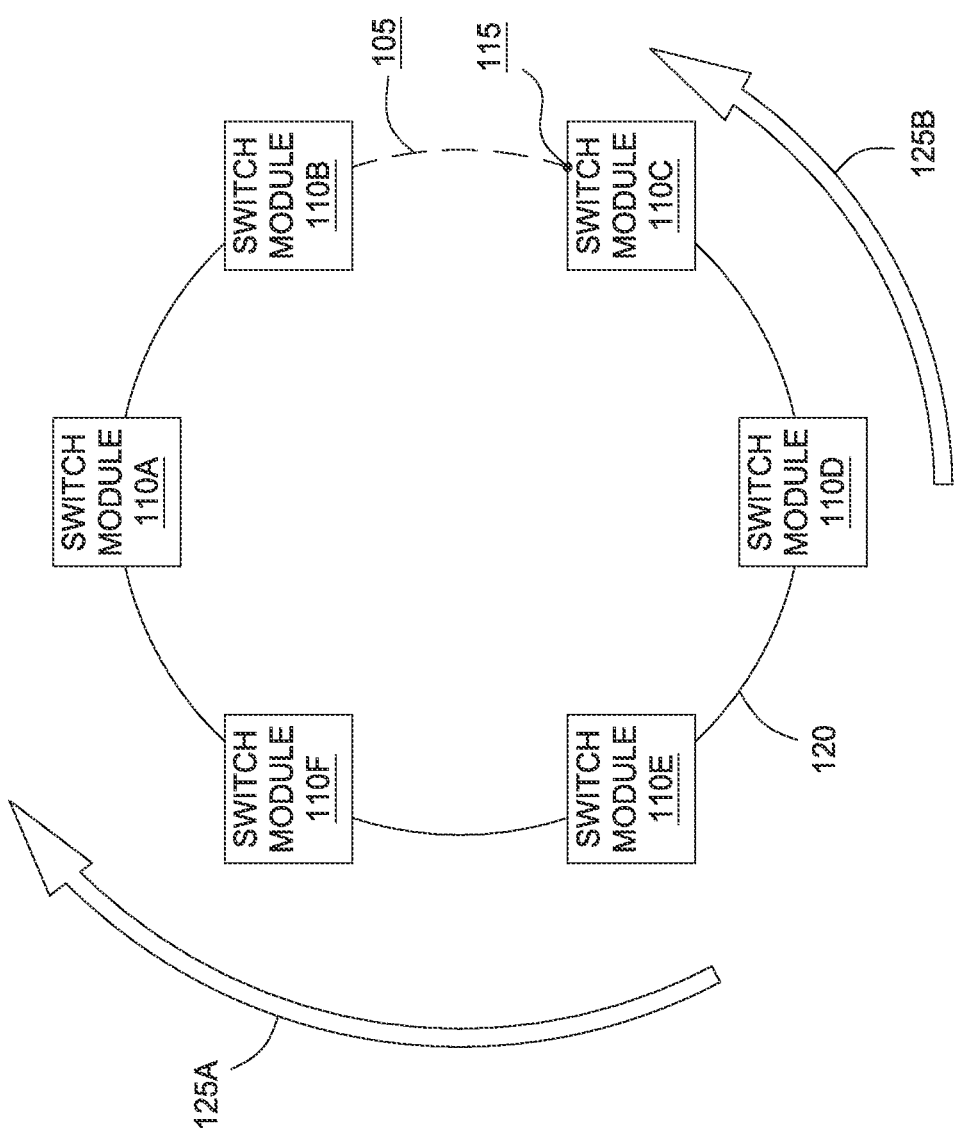
FIG. 1 is a block diagram illustrating network switches in a ring topology configured to provide a Resilient Ethernet Protocol segment, according to one embodiment described herein.

One embodiment presented in this disclosure provides a non-transitory computer-readable medium containing computer program code that, when executed, performs an operation. The operation includes monitoring for link failure events within a Resilient Ethernet Protocol (REP) environment. Additionally, the operation includes, upon determining, at a first network switch within the REP environment, that a link failure event has occurred within the REP environment, transmitting a Hardware Flood Layer (HFL) notification data packet specifying a Time-to-Live (TTL)

value of 2 to a second network switch within the REP environment. Upon determining that the link failure event has occurred, the operation also includes purging contents of a Media Access Control (MAC) table on the first network switch.

Another embodiment provides a network switch that includes a plurality of ports, a memory storing a Media Access Control (MAC) table and logic. The logic is configured to monitor for link failure events within a Resilient Ethernet Protocol (REP) environment in which the network switch is located. Additionally, the logic is configured to, upon determining that a link failure event has occurred within the REP environment, transmit a Hardware Flood Layer (HFL) notification data packet specifying a Time-to-Live (TTL) value of 2 to a second network switch within the REP environment. Upon determining that the link failure event has occurred, the logic s also configured to purge contents of the MAC table within the memory of the network switch.

Still another embodiment provides a system that includes a plurality of network switches configured in a loop topology. The plurality of network switches are further configured to establish a Resilient Ethernet Protocol (REP) segment. Additionally, each of the plurality of network switches includes a plurality of ports, a memory storing a Media Access Control (MAC) table and logic. The logic is configured to monitor for link failure events within the REP segment. Additionally, upon determining that a link failure event has occurred within the REP segment, the logic is configured to transmit a Hardware Flood Layer (HFL) notification data packet specifying a Time-to-Live (TTL) value of 2 to another network switch within the plurality of network switches. Upon determining that a link failure event has occurred within the REP segment, the logic is also configured to purge contents of the MAC table within the memory of the respective network switch.

Example Embodiments

Layer 2 is typically referred to as the data link layer or the MAC layer. Generally, communications on the data link layer use a communication protocol which contains the physical address of a client or server station, which is inspected by a bridge or switch. The layer 2 switch then forwards traffic based on the MAC layer (Ethernet or Token Ring) addresses. The data link layer typically handles error notification, network topology, and flow control. Numerous media access methods exist that offer the functionality defined by the data link layer, such as Ethernet, Token Ring, and Fiber Distributed Data Interface (FDDI).

Generally, a number of different network topologies exist, each having various advantages and disadvantages. One such topology is a ring topology, which connects each node to exactly two other nodes, thereby forming a single, continuous pathway through the network. Ring topologies offer numerous advantages, such as ease of installing and reconfiguring additional network devices and the lack of a central node tasked with managing inter-node connectivity. However, special care must be taken to handle failures in a ring network, as a single malfunctioning node can potentially create problems for the entire network. Moreover, as ring networks provide a continuous path through the nodes of the network, additional steps must be taken to prevent data packets from continuously traversing the nodes of the network.

A number of conventional techniques exist for handling link failures within a network. For example, the Resilient Ethernet Protocol (REP) utilizes a Hardware Flood Layer (HFL) module that facilitates convergence after link failures. While such techniques may produce more than satisfactory convergence rates for many networks, these convergence rates may be unsatisfactory particular networks which have more stringent network resilience requirements. For example, Connected Factory (CF) applications typically have very stringent network resilience requirements, such as a maximum convergence rate of 50 ms. Moreover, the cost of downtime in these networks can be very substantial, with each second of downtime potentially costing thousands of dollars.

While protocols such as REP produce more than satisfactory convergence rates after a link failure for a substantial number of applications, such protocols may struggle to meet the very stringent requirements of other applications (e.g., CF applications). As such, embodiments provide an optimized link failure detection and resolution protocol that improves convergence rates relative to conventional techniques. Embodiments include monitoring for link failure events within the REP environment. Upon determining, at a first network switch within the REP environment, that a link failure event has occurred within the REP environment, embodiments include transmitting a Hardware Flood Layer (HFL) notification data packet specifying a Time-to-Live (TTL) value of 2 to a second network switch within the REP environment and purging contents of a Media Access Control (MAC) table on the first network switch. Doing so ensures that each HFL message (of potentially multiple HFL messages) generated responsive to a link failure event is received by each network switch within the REP environment, thereby improving the convergence rate of the REP environment responsive to a link failure.

FIG. 1 is a block diagram illustrating network switches in a ring topology configured to provide a Resilient Ethernet Protocol segment, according to one embodiment described herein. As shown, the system 100 includes switch modules 110A-F, arranged in a ring topology. That is, each of the switch modules 110A-F is connected to exactly two other switch modules, forming a continuous path through the network. As discussed above, because ring topologies create a single, continuous path through the network, additional measures can be taken to prevent data packets from indefinitely looping through the switch modules 110A-F. In the depicted example, in order to create a REP segment (thereby preventing data packets from indefinitely traversing the switch modules 110A-F), port 115 of switch module 110C is blocked, thereby preventing connectivity on the link 105.

Figure 2A:
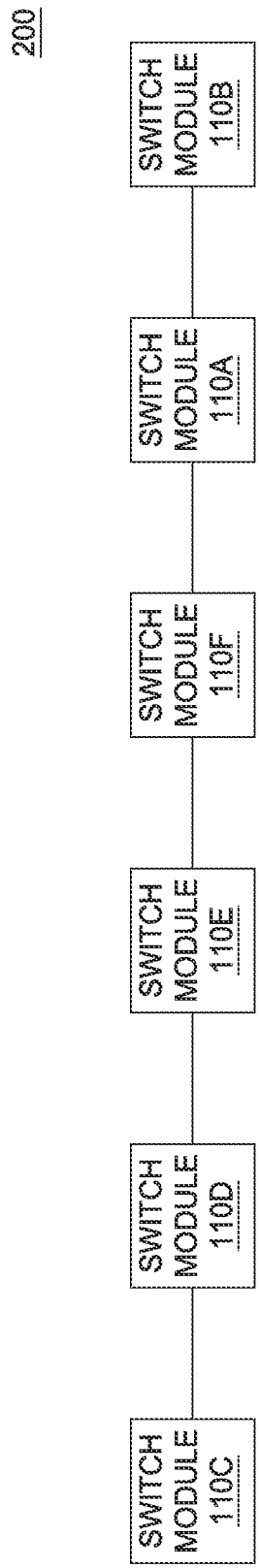
FIGS. 2A-B are block diagrams illustrating Resilient Ethernet Protocol segments, according to embodiments described herein.

The resulting REP segment is shown in FIG. 2A, which is a block diagram illustrating Resilient Ethernet Protocol segments, according to one embodiment described herein. As shown, the network 200 illustrates a path starting at switch module 110C, through switch modules 110D, 110E, 110F, and 110A, before terminating at switch module 110B. By disabling the port 115 and thereby breaking connectivity on the link 105, embodiments can effectively create the REP segment shown in network 200. Moreover, the port 115 can quickly be re-enabled in the event of a link failure, thereby creating a new REP segment and restoring connectivity between the switch modules 110A-F.

Generally, REP provides several mechanisms for restoring network connectivity in response to a link failure event. One such mechanism is the transmission of Link Status Layer (LSL) messages. Generally, LSL messages in a REP environment are used to establish connectivity with a unique neighboring switch module, periodically check the integrity of a switch module's connection with neighboring switch modules, acknowledge data received from a neighboring switch module, and so on. One advantage to LSL messages is the transmitting switch module can confirm the receipt of the LSL message by the destination switch module. That is, switch modules within a REP environment (e.g., switch modules 110A-F) are generally configured to transmit an acknowledgement message in response to receiving an LSL message. Likewise, if a predefined period of time passes before an acknowledgement message is received, the transmitting switch module can resend the original LSL message. This ensures that each LSL message is received by the destination switch module.

However, such a positive acknowledgement protocol introduces delay, as numerous LSL messages and corresponding acknowledgments must be transmitted in order for information to traverse a REP segment (e.g., traversing the REP segment 200 from switch module 110C to switch module 110B). As such, LSL messages may be generally unsuitable for use in handling link failure events within networks with very stringent network resilience requirements (e.g., CF applications). In such networks, LSL messages may still be used as a secondary mechanism for handling the link failures (i.e., in case a primary mechanism fails to handle to the link failure).

Typically, the HFL REP module is used as the primary mechanism for handling link failures within the REP segment, and generally produces much faster convergence rates than the LSL REP module. Generally, the HFL sends multicast Protocol Data Units (PDUs) to a predefined MAC address (e.g., 0100.0ccc.ccce) on the REP administrative Virtual Local Area Network (VLAN). HFL notifications are flooded in hardware to all switches with the REP segment. In one embodiment, the HFL packet format includes a Protocol Version, a Segment ID value, and Higher Layer Type Length Values (TLVs). Thus, HFL notifications can be used to rapidly transmit link failure events to all network switches within a REP segment.

As an example, assume that a link failure event occurs on the link 120 shown in FIG. 1. Such a link failure event could occur, for example, due to a problem with a port on the switch module 110E or 110D, a problem with the connection between the switch modules 110E and 110D, and so on. The switch modules 110D and 110E could detect the link failure, for example, by periodically polling the link 120 at a predefined interval. Upon detecting the link failure, a REP component (e.g., REP component 625, shown in FIGS. 6 and 7) on each of the switch modules 110D and 110E could generate an HFL notification to inform all switch modules within the REP segment of the link failure. For example, the switch module 110D could generate a HFL notification that is transmitted (i.e., as shown by direction 125B) to switch module 110C. Generally, logic (e.g., the REP component) for the alternate port (i.e., a block ported that creates the REP segment from the ring topology) is designed to decrement the HFL notification TTL value by 1 once the port has been unblocked. Therefore, if the original TTL value of the HFL notification is set to a value of 1, the decrement operation will result in a value of 0, and the HFL notification sent by switch module 110D will not flow beyond switch module 110C. Likewise, switch module 110E transmits a HFL notification (i.e., as shown by direction 125A), which is flooded to switch modules 110F, 110A and 110B. Assuming the TTL value of the HFL notification sent by the switch module 110E has a TTL value of 1, the HFL notification will not flow beyond switch module 110B. Doing so ensures that each switch module within the network 100 receives only a single HFL notification in response to the link failure event.

Figure 2B:
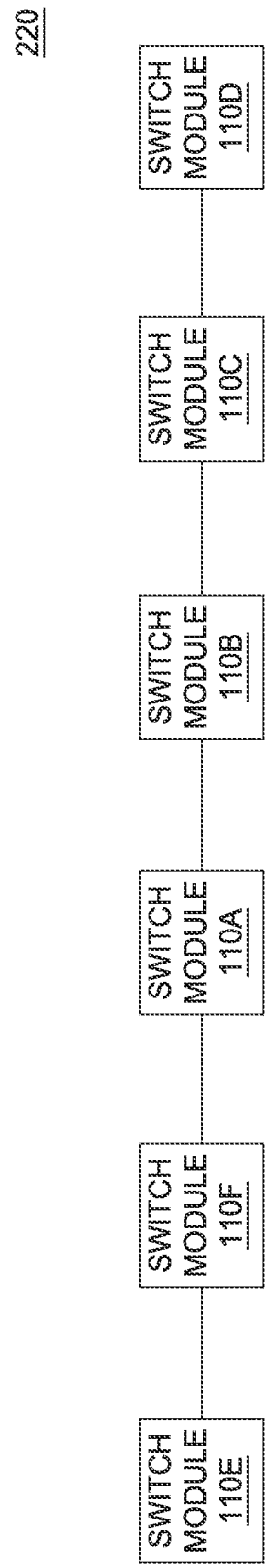

Responsive to receiving the HFL notification indicating that the link failure has occurred, the switch module 110C can unblock the blocked port 115. Doing so effectively creates a new REP segment, which is illustrated in FIG. 2B, which is a block diagram illustrating a Resilient Ethernet Protocol segment, according to embodiments described herein. As shown, the REP segment 220 now begins at switch module 110E, passing through switch modules 110F, 110A, 110B and 110C, and then ending at switch module 110D.

Upon receiving the HFL notification, each of the switch modules 110A-F can flush one or more MAC tables stored on the respective switch module 110A-F. For example, each of the switch modules 110A-F could store a table mapping MAC addresses to ports on the switch module. In one embodiment, such a MAC table is stored in a Ternary Content Addressable Memory (TCAM) on the switch module. That is, as the topology of the REP segment has changed (i.e., from REP segment 200 to REP segment 220, in the current example), the contents of the MAC tables are no longer valid. Accordingly, each of the switch modules 110A-F can purge this outdated information from the MAC tables, and can begin relearning the MAC address to port mappings under the new topology of the REP segment.

However, in the event one of the HFL messages is not successfully transmitted (i.e., from switch module 110E or 110D), at least one of the switch modules 110A-F will not be aware of the link failure. In such a scenario, a secondary notification message (e.g., LSL messages) can be used to notify these switch modules of the link failure. However, as such secondary mechanisms can be substantially slower than the HFL notifications, this can lead to unacceptable convergence rates that do not satisfy the very stringent requirements of particular applications (e.g., CF applications).

Additionally, even if the HFL messages are transmitted successfully, delay can be introduced if one of the switch modules 110E and 110D is slow to detect the link failure on link 120. For instance, if the switch modules 110E and 110D rely on polling to detect the link failure on the link 120, one of the switch modules 110E and 110D may detect the link failure substantially faster than the other switch module 110E and 110D. However, as the HFL messages having a TTL value of 1 transmitted from the switch modules 110E and 110D only reach a subset of the other switch modules within the network (e.g., the HFL notification from switch module 110D only reaches switch module 110C), both of the switch modules 110E and 110D must detect the link failure and transmit HFL notifications before the new REP segment can be established. As such, even if one of the switch modules 110E and 110D detects the link failure very quickly, the convergence rate of the network can be unacceptably slow if the other switch module is slower to detect the link failure.

Figure 3:
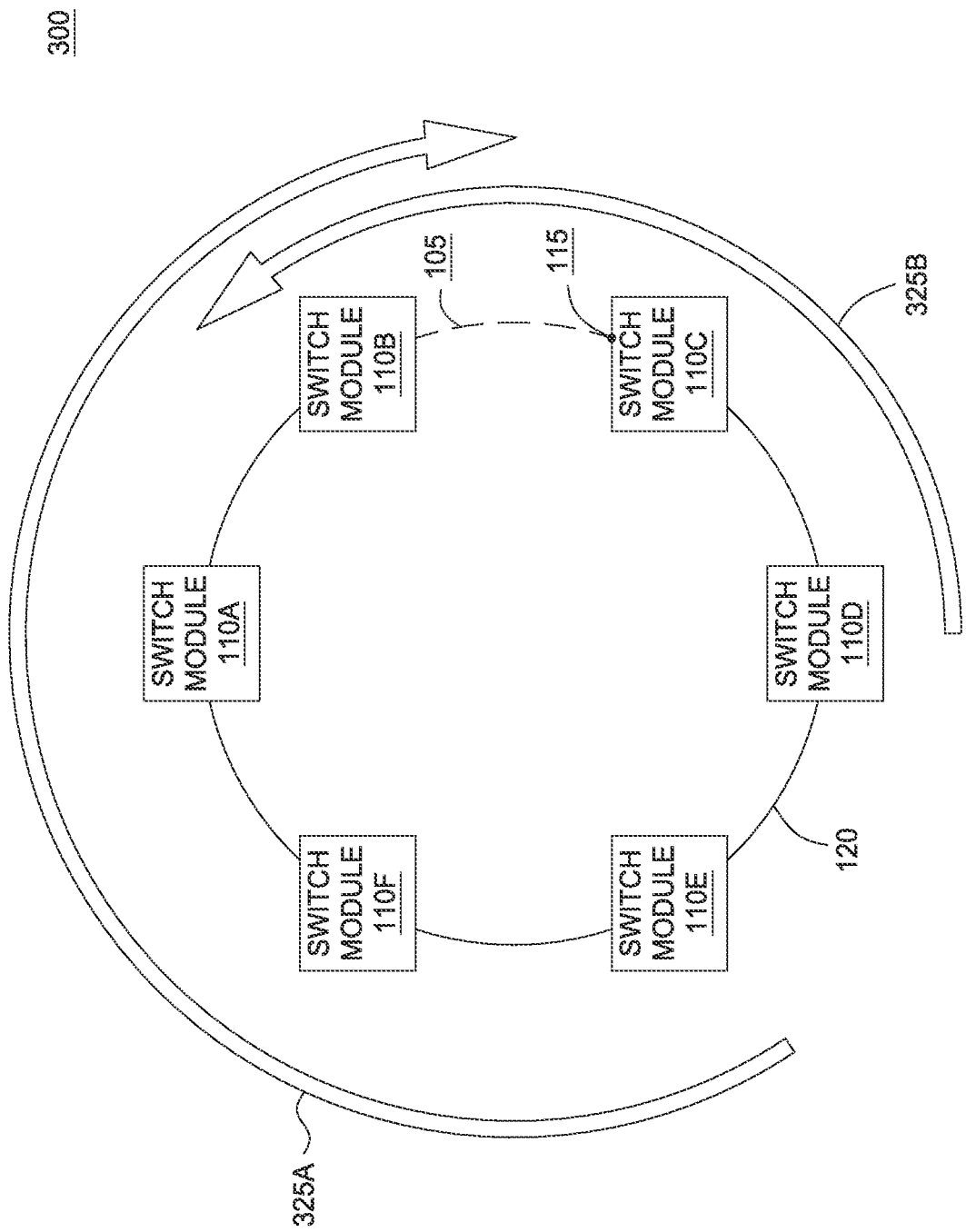
FIG. 3 is a block diagram illustrating network switches configured to provide a Resilient Ethernet Protocol segment after a link failure event, according to one embodiment described herein.

As such, each switch within the REP segment can be configured with respective a REP component 625, which provides optimized link failure detection and resolution and improves convergence rates. An example use of such HFL notifications is shown in FIG. 3, which is a block diagram illustrating network switches configured to provide a Resilient Ethernet Protocol segment after a link failure event, according to one embodiment described herein. As shown, FIG. 3 depicts a network 300 that includes switch modules 110A-F. In order to create a current REP segment (e.g., REP segment 200 shown in FIG. 2A), the port 115 on the switch module 110C is blocked, thereby disabling communications for the link 105.

The REP component 625 could monitor for link failure events within the REP environment and, upon determining that a link failure event has occurred within the REP environment, the REP component 625 could transmit a HFL notification data packet specifying a TTL value of 2. For example, each of the switch modules 110E and 110D could detect a link failure on the link 120 and, in response, could transmit respective HFL notifications specifying a TTL value of 2 (i.e., as shown by directions 325A and 325B, respectively). Of note, because the TTL value within the HFL notification is set to 2, the HFL notifications will no longer be dropped at the switch modules 110B and 110C, as even though the REP component 625 decrements the TTL value by 1 upon unblocking the blocked port, the TTL value will still be 1 (and thus greater than 0) following the decrement operation. Thus, the HFL notification transmitted from switch module 110D will be flooded not only to switch module 110C, but to switch modules 110B, 110A, 110F and 110E as well. Likewise, the HFL notification transmitted from switch module 110E will be flooded not only to switch modules 110F, 110A and 110B, but to switch modules 110C and 110D as well.

Moreover, the REP component 625 within each of the network switches can be configured to maintain HFL message status information that generally describes previously received HFL notifications. That is, because in such an embodiment the REP component 625 is configured to generate a HFL notification with a TTL value of 2, each of the switch modules within the network 300 may receive multiple instances of the same HFL notification. As such, in order to avoid unnecessarily flushing the MAC tables on the switch multiple times, in response to a single link failure event (e.g., the link failure of the link 120), the REP component 625 on each of the network switches can maintain HFL message status information to track whether a particular HFL notification has already been received at the respective network switch. In the event a HFL notification is received for the first time, the REP component 625 can flush the MAC table on the respective network switch. Moreover, in the event a port is blocked on the network switch (e.g., port 115 on switch module 110C) to create the existing REP segment, the REP component 625 could unblock the port responsive to receiving the HFL notification in order to create a new REP segment (i.e., REP segment 220 shown in FIG. 2B). Upon receiving any subsequent HFL notifications corresponding to the same link failure event (i.e., as determined by the REP component 625 using the HFL message status information), the REP component 625 can simply discard the subsequent HFL notification.

By doing so, embodiments ensure that each switch within the network 300 receive at least one HFL notification for a given link failure event. That is, even if one of the HFL notifications sent by one of the switch modules 110E or 110D is lost or is not sent for any reason, the HFL notification sent by the other switch module 110E or 110D will reach all of the switch modules within the network 300. Doing so improves the convergence rate of the network 300 in the event of a link failure, relative to relying on a secondary mechanism to inform the network switches of the link failure (e.g., LSL messages). Additionally, doing so ensures that the convergence rate of the network 300 is tied directly to whichever switch module (i.e., switch module 110E or 110D, in this example) detects the link failure event more quickly (e.g., by periodically polling the link status). This further improves the convergence rate of the network 300 in the event of a link failure. Furthermore, by maintaining the HFL message status information, the network switches within the network 300 can avoid flushing their respective MAC tables multiple times in response to a single link failure event.

Figure 4:
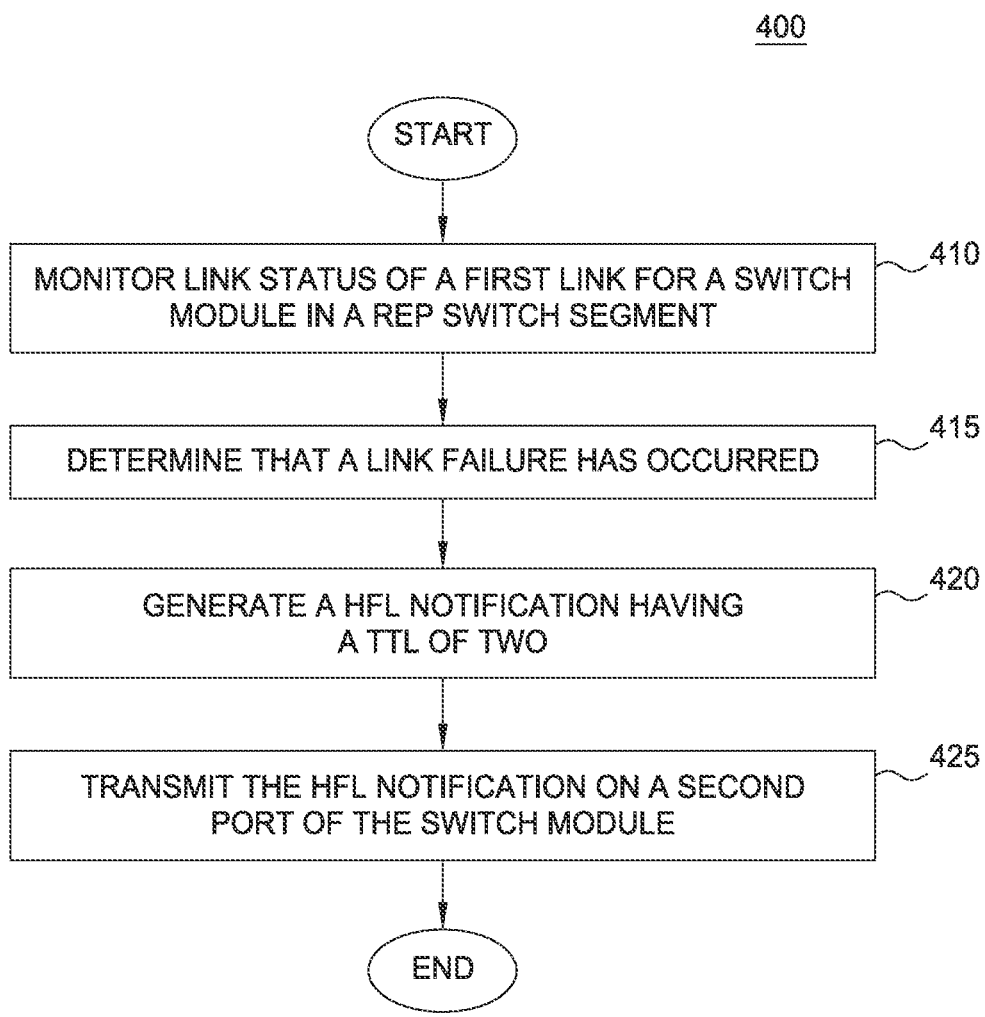
FIG. 4 is a flow diagram illustrating a method of generating a hardware flood layer notification responsive to detecting a link failure, according to one embodiment described herein.

FIG. 4 is a flow diagram illustrating a method of generating a hardware flood layer notification responsive to detecting a link failure, according to one embodiment described herein. As shown, the method 400 begins at block 410, where the REP component 625 monitors the link status of a first link for a switch module in a REP switch segment. The REP component 625 determines that a link failure has occurred (block 415). For example, the REP component 625 could poll the first link periodically to determine when the link status event occurs.

Upon detecting that the link failure has occurred, the REP component 625 generates a HFL notification having a TTL value of 2 (block 420). That is, by setting the TTL value to 2 within the generated HFL notification, the REP component 625 ensures that all network switches within the REP segment will receive the generated HFL notification. The REP component 625 transmits the HFL notification on a second port of the switch module (block 425), and the method 400 ends.

Figure 5:
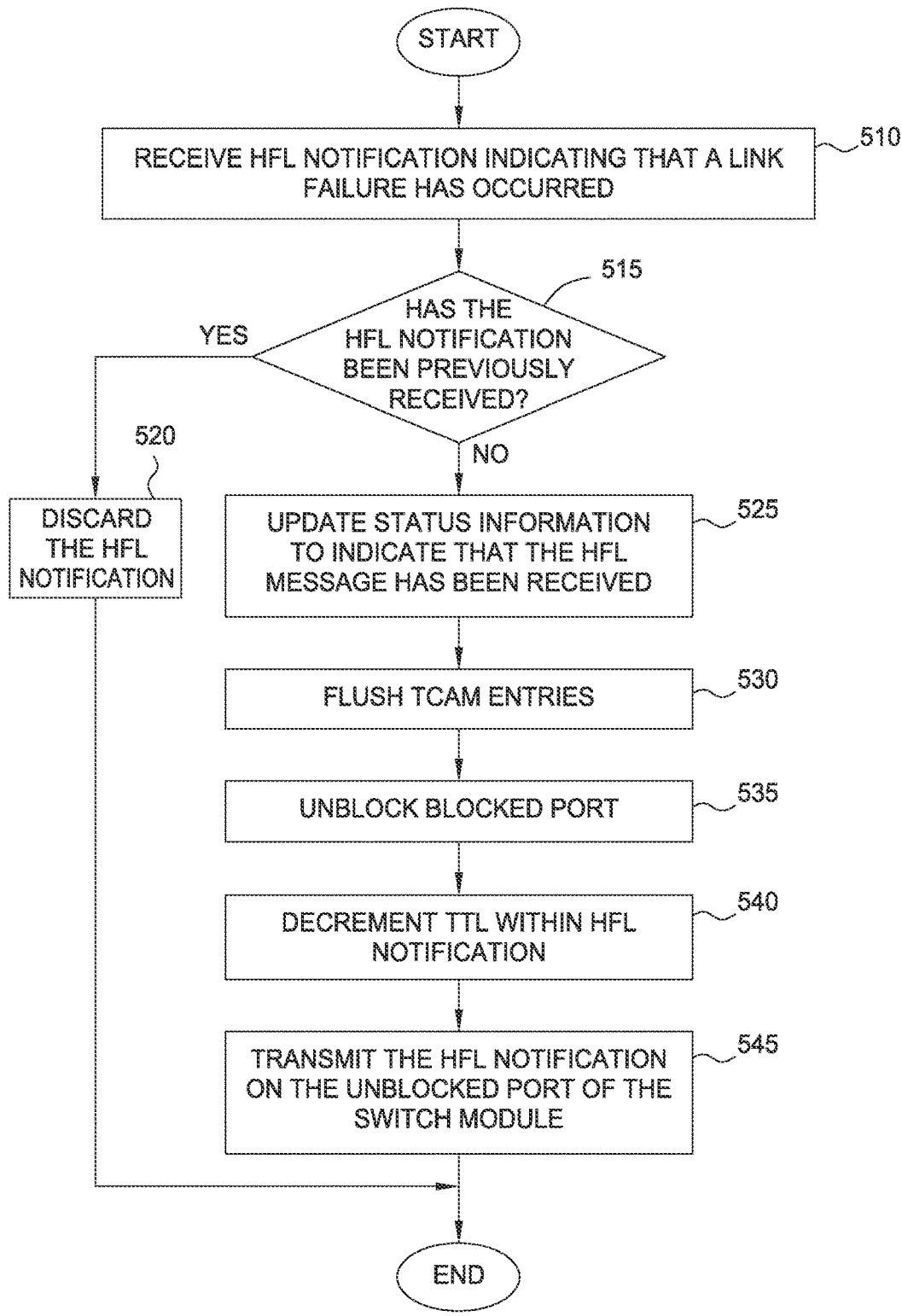
FIG. 5 is a flow diagram illustrating a method of processing a hardware flood layer notification, according to one embodiment described herein.

FIG. 5 is a flow diagram illustrating a method of processing a hardware flood layer notification, according to one embodiment described herein. As shown, the method 500 begins at block 510, where the REP component 625 receives a HFL notification indicating that a link failure has occurred. The REP component 625 determines whether the HFL notification has been previously received at the network switch on which the REP component 625 resides (block 515). If the HFL notification has been previously received, the REP component 625 discards the HFL notification (block 520) and the method 500 ends. Doing so enables the REP component 625 to avoid unnecessarily purging the MAC tables on the network switch multiple times, in response to a single link failure event.

If the REP component 625 determines that the HFL notification has not yet been received, the REP component 625 updates status information on the network switch on which the REP component 625 resides to indicate that the HFL message has been received (block 525). The REP component 625 further flushes TCAM entries on the network switch (block 530). That is, the REP component 625 may purge the contents of one or more MAC tables within a TCAM on the network switch, as the contents of the MAC table(s) no longer reflect the updated topology of the REP segment. Of note, while the MAC tables are stored within a TCAM in the depicted embodiment, more generally it is contemplated that the REP component 625 can purge the contents of any MAC table stored in any suitable memory location, consistent with the present disclosure.

Additionally, the REP component 625 unblocks a blocked port on the network switch (block 535). That is, as a link failure has occurred within the REP segment, the REP component 625 can unblock the blocked port on the network switch device to establish the new REP segment. Doing so ensures that traffic can still flow between all of the network switch devices within the REP segment.

The REP component 625 of the network switch that owns the blocked port decrements the TTL value within the HFL notification from a value of 2 to a value of 1 (block 540), and transmits the HFL notification on the newly unblocked port of the network switch module (block 545), at which point the method 500 ends. Doing so ensures that the HFL notification will reach each network switch within the REP segment. Moreover, by updating the status information on the network switch to indicate that the HFL message has been received, the REP component 625 ensures that the TCAM entries are only flushed a single time in response to a given link failure event.

Figure 6:
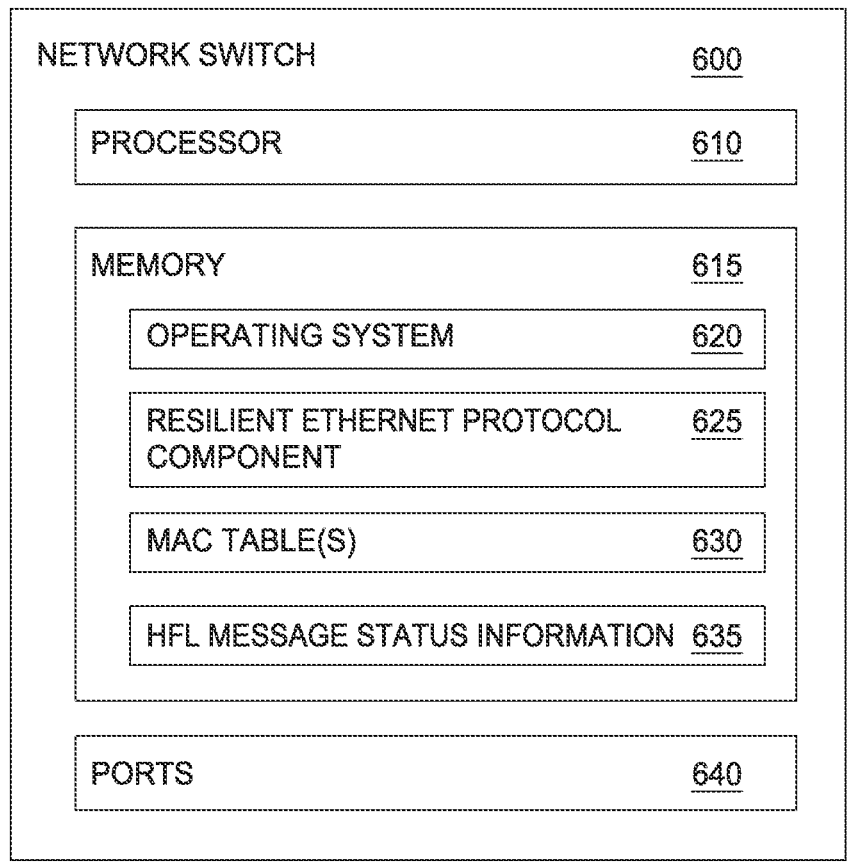
FIG. 6 is a block diagram illustrating a network switch configured with a Resilient Ethernet Protocol component, according to one embodiment described herein.

FIG. 6 is a block diagram illustrating a network switch configured with a Resilient Ethernet Protocol component, according to one embodiment described herein. The network switch 600 includes a processor 610, a memory 615 and a plurality of port 640. The processor 610 may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

The memory 615 may be either volatile or non-volatile memory and include, RAM, flash, cache, disk drives and the like. Although shown as a single entity, the memory 615 may be divided into different memory storage elements such as RAM and one or more hard disk drives. In one embodiment, the memory 615 comprises one or more static random access memory (SRAM) modules. As shown, the memory 615 includes an operating system 620, a REP component 625, MAC table(s) 630 and HFL Message Status Information 635. The operating system 620 generally controls the execution of application programs on the action disc device 700. Examples of operating system 730 include, without limitation, versions of Cisco® IOS®, Cisco® Catalyst OS, UNIX and distributions of the Linux® operating system.

Generally, the MAC table(s) 630 represents a data structure that maps MAC addresses to ports in the plurality of ports 640. In one embodiment, the MAC table(s) 630 is stored in a ternary content addressable memory (TCAM). The HFL message status information 635 generally represents a data structure that stores information describing previously received HFL notifications. For example, the REP component 625 could access the HFL message status information 635 upon receiving a HFL notification for a particular link status event, to determine whether previous HFL notifications have been received for the particular link status event. If no previous HFL notifications have been received for the particular link status event, the REP component 625 could process the received HFL notification, and otherwise the REP component 625 could discard the received HFL notification.

The REP component 625 is generally configured to optimize link failure convergence for a Resilient Ethernet Protocol (REP) networks. For instance, the REP component 625 can monitor for link failure events within the REP environment. Additionally, upon determining that a link failure event has occurred within the REP environment, the REP component 625 can purge contents of the MAC table(s) 630 on the network switch 600. Moreover, the REP component 625 can transmit a Hardware Flood Layer (HFL) notification data packet specifying a Time-to-Live (TTL) value of 2 to a second network switch within the REP environment. Doing so ensures that every network switch within the REP environment will receive the HFL notification data packet, thereby improving link failure convergence of the REP environment.

Figure 7:
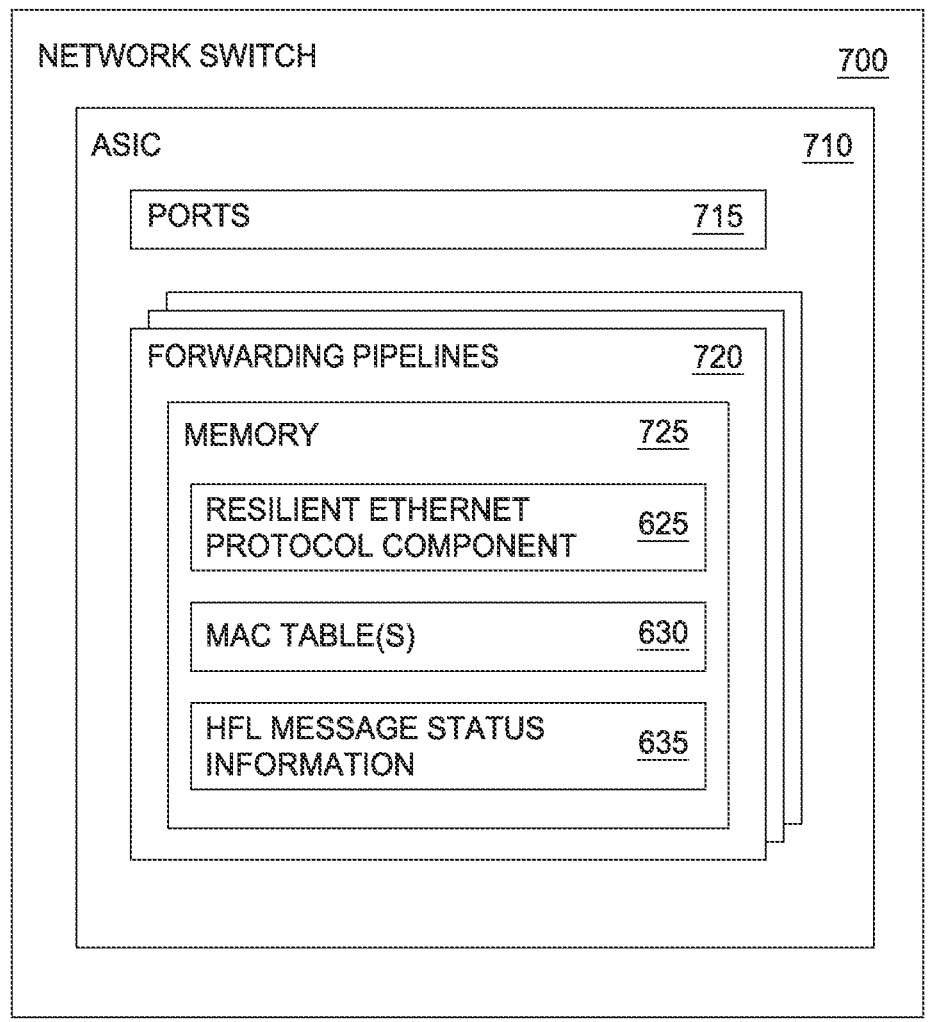
FIG. 7 is a block diagram illustrating a distributed network switch configured with a Resilient Ethernet Protocol component, according to one embodiment described herein.

FIG. 7 is a block diagram illustrating a network switch configured with a Resilient Ethernet Protocol component, according to one embodiment described herein. The network switch 700 includes an ASIC 710, and the ASIC 710 includes a plurality of ports 715, a plurality of forwarding pipelines 720. In one embodiment, the network switch 700 further contains one or more processors (not shown). The processor(s) may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

Each of the forwarding pipelines 720 includes a memory 725. The memory 725 may be either volatile or non-volatile memory and include, RAM, flash, cache, disk drives and the like. Although shown as a single entity, the memory 725 may be divided into different memory storage elements such as RAM and one or more hard disk drives. In one embodiment, the memory 725 comprises one or more static random access memory (SRAM) modules. As shown, the memory 725 includes a REP component 625, MAC table(s) 630 and HFL Message Status Information 635.

As discussed above, the REP component 625 is generally configured to optimize link failure convergence for a Resilient Ethernet Protocol (REP) networks. For instance, the REP component 625 could monitor for link failure events and, upon determining that a link failure event has occurred within the REP environment, the REP component 625 could purge contents of the MAC table(s) 630 on the network switch 600. Moreover, the REP component 625 can transmit a Hardware Flood Layer (HFL) notification data packet specifying a Time-to-Live (TTL) value of 2 to a second network switch within the REP environment. Doing so ensures that every network switch within the REP environment will receive the HFL notification data packet, thereby improving link failure convergence of the REP environment.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications executing on a REP segment available in the cloud. For example, the REP component 625 could execute on a network switch within a REP segment in the cloud and, upon detecting a link failure has occurred, could transmit a HFL message having a TTL value of 2. In such a case, the REP component 625 on other switches within the REP segment could receive the HFL message and, upon determining the HFL message has not been previously received at the other switch, the REP component 625 could perform one or more convergence operations responsive to the link failure (e.g., purging a MAC table on the network switch, unblocking a port, etc.). Doing so allows a user to benefit from rapid link failure convergence within the REP segment, from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a plurality of network switches within a Resilient Ethernet Protocol (REP) environment, wherein the plurality of network switches includes at least a first network switch, a second network switch, a third network switch and a fourth network switch, wherein the plurality of network switches are connected in a ring topology, and wherein a port of the second network switch is blocked to create a current REP segment,
wherein the first network switch is configured to determine that a link failure event, corresponding to a first link failure, has occurred within the REP environment, and in response, transmit a Hardware Flood Layer (HFL) notification data packet specifying a Time-to-Live (TTL) value of 2 to the second network switch of the plurality of network switches within the REP environment,
wherein the second network switch is configured to, responsive to receiving the HFL notification data packet:
unblock the blocked port of the second network switch to create a new REP segment;
decrement the TTL value in the HFL notification data packet from 2 to 1;
forward, using the unblocked port, the HFL notification data packet specifying the TTL value of 1 to the third network switch of the plurality of network switches within the new REP segment; and
purge contents of a Media Access Control (MAC) table on the second network switch; and
wherein the first network switch is further configured to, upon receiving a second HFL notification data packet corresponding to the first link failure and specifying the TTL value of 1, from the fourth network switch of the plurality of network switches, discard the second HFL notification data packet without forwarding the second HFL notification data packet to the second network switch.

2. The system of claim 1, wherein the first network switch is further configured to:
poll a first port of the first network switch to detect that the link failure event has occurred,
wherein the HFL notification data packet is transmitted across the unblocked port of the first network switch, the unblocked port distinct from the first port.

3. The system of claim 1, wherein the first network switch within the REP environment is configured to determine that the link failure event has occurred within the REP environment by, at least in part:
receiving, from a fourth network switch within the REP environment, a second HFL notification data packet specifying TTL value of 2, and
wherein monitoring for the link failure events within the REP environment further comprises monitoring for receipt of the second HFL notification data packet.

4. The system of claim 1, wherein the transmitting and the purging are performed only upon determining that, prior to receiving the link failure event at the second network switch, no additional link failure events corresponding to the first link failure were received at the second network switch.

5. The system of claim 1, wherein the MAC table is stored within a ternary content addressable memory (TCAM) on the second network switch, and wherein purging the contents of the MAC table on the second network switch further comprises purging contents of the TCAM.

6. A data communications network, comprising:
a plurality of network switches comprising a first network switch, a second network switch, a third network switch and a fourth network switch, wherein the plurality of network switches are connected in a ring topology, and wherein a port of the second network switch is blocked to create a current Resilient Ethernet Protocol (REP) segment,
wherein the first network switch is configured to determine that a link failure event, corresponding to a first link failure, has occurred and in response, transmit a Hardware Flood Layer (HFL) notification data packet specifying a Time-to-Live (TTL) value of 2 to the second network switch,
wherein the second network switch is configured to, responsive to receiving the HFL notification data packet:
identify the blocked port of the second network switch that is blocked to create a current REP segment;
unblock the blocked port of the second network switch to create a new REP segment;
decrement the TTL value in the HFL notification data packet from 2 to 1;
forward, using the unblocked port, the HFL notification data packet specifying the TTL value of 1 to the third network switch of the plurality of network switches within the new REP segment; and
purge contents of a Media Access Control (MAC) table within a memory of the second network switch; and
wherein the first network switch is further configured to, upon receiving a second HFL notification data packet corresponding to the first link failure and specifying the TTL value of 1, from the fourth network switch of the plurality of network switches, discard the second HFL notification data packet without forwarding the second HFL notification data packet to the second network switch.

7. The data communications network of claim 6, wherein the second network switch is configured to, upon determining that the link failure event has occurred, unblock a blocked port of the second network switch.

8. The data communications network of claim 7, wherein the second network switch is further configured to:
responsive to unblocking the blocked port, decrement the TTL value in the HFL notification data packet to 1; and
forward the HFL notification data packet specifying the TTL value of 1 to the third network switch.

9. The data communications network of claim 6, wherein the first network switch is further configured to:
poll a first port of the first network switch to detect that the link failure event has occurred,
wherein the HFL notification data packet is transmitted across a second port of the first network switch, the second port distinct from the first port.

10. The data communications network of claim 6, wherein the first network switch is configured to determine that the link failure event has occurred by, at least in part:
receiving, from the fourth network switch within the REP environment, a second HFL notification data packet specifying TTL value of 2, and
monitoring for the link failure events by monitoring for receipt of the second HFL notification data packet.

11. The data communications network of claim 6, wherein the transmitting and the purging operations are performed only upon determining that, prior to receiving the link failure event at the second network switch, no additional link failure events corresponding to the first link failure were received at the second network switch.

12. The data communications network of claim 6, wherein the memory is a ternary content addressable memory (TCAM), and wherein purging the contents of the MAC table further comprises purging contents of the TCAM.

13. A system, comprising:
a plurality of network switches within a Resilient Ethernet Protocol (REP) environment, the plurality of network switches configured in a ring topology, wherein each of the plurality of network switches comprises:
  a plurality of ports;
  a memory storing a Media Access Control (MAC) table; and
  logic configured to:
    monitor for link failure events within a REP segment;
    determine that a link failure event, corresponding to a first link failure, has occurred within the REP segment, and in response, transmit a Hardware Flood Layer (HFL) notification data packet specifying a Time-to-Live (TTL) value of 2 to another network switch within the plurality of network switches, wherein the other network switch is configured to, responsive to receiving the HFL notification data packet:
      identify a port of the other network switch, wherein the port of the other network switch is blocked to create a current REP segment;
      unblock the blocked port of the other network switch to create a new REP segment;
      decrement the TTL value in the HFL notification data packet from 2 to 1;
      forward, using the unblocked port, the HFL notification data packet specifying the TTL value of 1 to a third network switch within the plurality of network switches; and
      purge contents of the MAC table within the memory of the other network switch; and
    receive a second HFL notification data packet corresponding to the first link failure and specifying the TTL value of 1, from a fourth network switch of the plurality of network switches, and in response discard the second HFL notification data packet without forwarding the second HFL notification data packet to the other network switch.

14. The system of claim 13, wherein the logic configured to determine that a link failure event has occurred within the REP segment comprises logic configured to:
  receive, from one of the plurality of network switches within the REP segment, a third HFL notification data packet specifying TTL value of 2, and
wherein the logic configured to monitor for the link failure events within the REP segment further comprises logic configured to monitor for receipt of the second HFL notification data packet, and
wherein the logic is further configured to:
  receive a second link failure event corresponding to the first link failure; and
upon determining that the link failure event corresponding to the first link failure has already been received, discard the second link failure event without forwarding the second link failure event on to any of the plurality of network switches.

* * * * *